US00RE39712E

(19) United States
(12) Reissued Patent
Vogel

(10) Patent Number: US RE39,712 E
(45) Date of Reissued Patent: Jul. 3, 2007

(54) DIGITAL IMAGING DEVICE OPTIMIZED FOR COLOR PERFORMANCE

(75) Inventor: Richard M. Vogel, Pittsford, NY (US)

(73) Assignee: Eastman Kodak Company, Rochester, NY (US)

(21) Appl. No.: 11/405,920

(22) Filed: Apr. 17, 2006

Related U.S. Patent Documents

Reissue of:
(64) Patent No.: 5,668,596
Issued: Sep. 16, 1997
Appl. No.: 08/608,649
Filed: Feb. 29, 1996

(51) Int. Cl.
*H04N 5/228* (2006.01)

(52) U.S. Cl. ..... 348/222.1; 348/266; 348/273
(58) Field of Classification Search ..... 348/222.1, 348/229.1, 230.1, 231.99, 231.3, 231.6, 266, 348/373, 273; *H04N 5/228, 9/07*
See application file for complete search history.

(56) References Cited

U.S. PATENT DOCUMENTS

| | | | | |
|---|---|---|---|---|
| 5,001,663 A | * | 3/1991 | Parulski et al. | 708/607 |
| 5,016,107 A | * | 5/1991 | Sasson et al. | 348/231.1 |
| 5,189,511 A | * | 2/1993 | Parulski et al. | 358/518 |
| 5,253,047 A | * | 10/1993 | Machishima | 348/224.1 |
| 5,652,643 A | | 7/1997 | Saito et al. | |
| 5,805,213 A | * | 9/1998 | Spaulding et al. | 348/222.1 |

OTHER PUBLICATIONS

"Color Science in Television and Display Systems" by W.N. Sproson, 1983, pp. 27–39.*
CIE publication 15.2 (1986) "Colorimetry—Second Edition", pp. 21–24,66–67.*
ICC Profile Format Specification (Version 3.2, Nov. 20, 1995) published By The International Color Consortium, pp. 24–26.*
"Getting Color in Sync" Bruce Fraser. MacUser, Apr. 1996. (available Feb. 1996).*
Service Manual CCD—TR3/TR500 for the Sony Video Hi8 Handycam, copyright 1993 –pp. 39–42 (overall block diagram), 194–208 (Camera Section Adjustments, preparations before adjustment, 7–1 to 7–1–6), 224–225 (Camera System Adjustments—15. color reproduction adjustment and 16. auto white balance reference data input).
U.S. Appl. No. 08/569,645, Spaulding et al., filed Dec. 8, 1995.*

* cited by examiner

*Primary Examiner*—Sherrie Hsia
(74) *Attorney, Agent, or Firm*—Pamela R. Crocker

(57) ABSTRACT

A digital imaging device captures an image and generates a color signal from the image for application to an output device having specific color sensitivities, the imaging device further being one of many devices of the same type useful with the output device. The digital imaging device, for example a digital camera, includes a color sensor for capturing the image and generating a color signal from the captured image, the color sensor having predetermined spectral sensitivities, and an optical section that is interposed in the image light directed to the color sensor, the optical section also having predetermined spectral characteristics. The combination of the spectral sensitivities of the color sensor and the spectral characteristics of the optical section uniquely distinguish this particular imaging device from other imaging devices of the same type. By providing a set of matrix coefficients uniquely determined for this imaging device, the matrix coefficients optimally correct the spectral sensitivities of the color sensor and the spectral characteristics of the optical section for the color sensitivities of the output device.

33 Claims, 8 Drawing Sheets

DIGITAL IMAGING DEVICE OPTIMIZED FOR COLOR PERFORMANCE

Matter enclosed in heavy brackets [ ] appears in the original patent but forms no part of this reissue specification; matter printed in italics indicates the additions made by reissue.

*This application is a reissue application for U.S. Pat. No.* 5,668,596 issued on Sep. 16, 1997 on U.S. Ser. No. 08/608, 649 filed Feb. 29, 1996

FIELD OF THE INVENTION

This invention pertains to the field of digital imaging and, more particularly, to the optimization of the color performance of digital imaging device, such as digital cameras and scanners.

BACKGROUND OF THE INVENTION

Correction matrices are useful in a variety of color imaging applications to effect color conversion or correction. For instance, a conversion matrix is used to convert red, green, and blue video signals into Y (luminance) and I, Q (chrominance) signals. A color correction matrix is used to correct the spectral sensitivities of a video camera for the chromaticities of the phosphor set of the particular display in use. Another use is with film-to-video conversion, a process in which a color correction matrix operates on the film scanning signals to correct the film colorimetry for video display. While these systems were typically analog systems, matrix processing is particularly adapted to a digital environment.

Continuing advances in semiconductor technology in areas such as digital memory, digital application-specific integrated circuits (BASICS) and charge-coupled device (CCD) images have made possible the introduction in recent years of digital electronic cameras. Evolution of this product segment will be driven by ever increasing consumer demands for better performance in such areas as resolution, photographic speed, and color reproduction. In the area of color reproduction it is desirable to select an optimum set of spectral characteristic for the CCD imager. The prior art (for example, as described in Color Science in Television and Display Systems by W. N. Sproson, published by Adam Hilger Ltd, 1983), teaches that one step toward the goal of good color reproduction is to choose a set of spectral characteristics for the camera which are as close as possible to the spectral characteristics of the intended display device. In the aforementioned Spronson text, a color cathode-ray tube (CRT) is used as an example of a typical display device where the defining spectral characteristics are easily derived by someone skilled in the art from a knowledge of the CRT's phosphor chromaticities and white-point setting, as well as a knowledge of the spectral response of the human eye. The resulting spectral curves are referred to as the color-matching functions (CMFs) for the display.

It is desirable to have the camera exhibit spectral sensitivities only in the visible portion of the electro-magnetic spectrum (approximately 400 to 700 nm). In addition, it is desirable that the overall spectral sensitivities of the camera correspond to a set of all-positive color-matching-functions (CMFs). If these requirements are met, the camera will be able to discern color information in the scene in much the same way that a human observer does. Failure to achieve this goal will result in color reproduction errors. (This failure mechanism is referred to as metamerism.)

A set of spectral curve is defined as a set of CMFs if, and only if, it can be exactly derived from the spectral response of the human eye via a linear 3×3 transformation. An infinite number of CMFs are possible according to this definition. The CIE (Commission Internationale De L'Eclairage) has published standardized spectral data sets describing the response of the human eye. This day may be found in CIE publication 15.2 (1986) Colorimetry—Second Edition in table 2.5. Another useful feature of CMFs is the fact that any two sets of CMFs are directly related to each other through a unique 3×3 linear transformation.

One practical limitation in the selection of a set of CMFs for the camera is the restriction that they be all positive, whereas the CMF's decreasing a color CRT typically have negative lobes. This is not a problem in practice since a linear 3×3 transformation may be employed, as discussed above, to correct the camera's output color signals for rendition on the CRT display. This linear 3×3 transformation is often referred to in the art as a color-correction matrix. Another practical restriction in the selection of a set of camera CMF's is the need to minimize the size of the off-diagonal coefficient in the color-correction matrix since these are directly responsible for degrading the noise performance of the imaging system.

The optical path of an electronic camera may consist of various components—each with its own spectral characteristics. Among these components one would ordinarily find a lens, blur-filter, infra-red cut-off filter and a CCD imager. The overall spectral sensitivity of the camera is determined by the combined spectral responses of the individual components. FIG. 1 illustrates the spectral characteristics for a typical color CCD camera including the combined effects of all of the optical components. These curves have been normalized to unit response for comparison purposes as is the standard practice when working with color-matching functions.

Included in FIG. 1 is a second set (dotted lines) of curves representing the transformed spectral characteristics of the camera following the color-correction matrix operation. Note that the transformed spectral responses have negative lobes whereas the original camera spectral responses do not. FIG. 2 compares the transformed spectral responses of the camera (dotted lines) with the CMF's for a CRT having CCIR Rec. 709 phosphors and a 6500 Kelvin white point. It can be seen that elements in a real camera have errors in spectral response that prevent replication of CMFs regardless of the transformation. Errors are normally spread among all colors in a way that minimizes color errors, but the result inevitably is not a perfect match, as seen particularly in the transformed camera red spectral response in FIG. 2.

The use of a color-correction matrix is shown in U.S. Pat. No. 5,253,047, in which a color temperature detecting circuit modifies the matrix coefficients for a primary color separator used to perform a color-correction operation for a color video camera. The primary color separator is used to compute the red, green and blue primary color signals for the luminance/chrominance signals generated by the camera detector circuitry. In U.S. patent application Ser. No. 08/569, 645, "Method and Apparatus for Color-Correcting Multichannel Signals of a Digital Camera", filed Dec. 8, 1995 to Spaulding et al. an improved method is used to select the color-correction matrix coefficients to account for changes i9n illuminant color temperature. In particular, this method provides optimum compensation for variations in the scene illuminant by using all of the degrees-of-freedom available in the primary color separator matrix.

A color-correction matrix is shown in U.S. Pat. No. 5,001,663 as one component of a digital-signal processing chipset for a high performance digital color video camera. The implementation illustrated requires that the matrix be mask-programmed into the chip during fabrication. This approach fixes the matrix coefficients during the production process such that color correction is specific to a defined type, or family, of cameras. This is ordinarily done by establishing the matrix coefficients to account for the optical component spectral characteristic or illuminant color temperature of a defined reference camera, and then embodying these coefficients in each manufactured camera.

U.S. Pat. No. 5,189,511 is a further example of the approach, describing improved resolution and reproduction of hard copies made from images captured by different types of electronic still cameras. Subtractive-type color processing is used to attempt to stabilize the primaries associated with image dyes used to produce the hard copy images, preceded by additive-type processing which attempts to correct the camera sensitivities appropriately for the stabilized primaries. The additive-type color processing may be in the camera itself to ensure that each output device achieves optimum color reproduction from signals corresponding to those provided by a defined reference camera. This arrangement allows signals from different types of cameras, i.e., corresponding to different defined reference cameras (e.g., high resolution professional cameras vs. low resolution consumer cameras), to provide input to different types of hardcopy devices and media.

As digital cameras and low cost scanner proliferate in the marketplace, there is increased need that images from comparable cameras or scanners produce comparable colors to the human observer. Unfortunately, small variations in optical component spectral characteristics, even within the same family of cameras, can produce noticeable color differences in the output image. Heretofore, the approaches taken do not account for variations in optical component spectral characteristics from individual imaging device to individual imaging device.

SUMMARY OF THE INVENTION

The aforementioned problems are solved with a technique for optimum color correction utilizing customized matrix coefficients for a particular imaging device. According to the invention, a digital imaging device captures an image and generates a color signal from the image for application to an output device having specific color sensitivities, the imaging device further being one of many devices of the same type useful with the output device. The digital imaging device, for example, a digital camera, includes a color sensor for capturing the image and generating a color signal from the captured image, the color sensor having predetermined spectral sensitivities, and an optical section that is interposed in the image light directed to the color sensor, the optical section also having predetermined spectral characteristics. Importantly, the combination of the spectral sensitivities of the color sensor and the spectral characteristics of the optical section uniquely distinguish this particular imaging device from other imaging devices of the same type. By providing a set of matrix coefficients uniquely determined for this imaging device, the matrix coefficients optimally correct the spectral sensitivities of the color sensor and the spectral characteristics of the optical section for the color sensitivities of the output device.

Besides providing an optimal level of color correction, the present invention has the advantage that the color reproduction variation from one camera to the next is accordingly minimized. This reduces the occurrence of color nonuniformity between the same digital images captured by different digital cameras.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because electronic imaging devices employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system description as described in the following materials, all such software implementation is conventional and within the ordinary skill in such arts.

As understood in the prior art, a digital imaging device is a device which uses an electronic sensor to capture an image either directly from an object or indirectly from a medium, such as film; signal processing to represent the captured signal numerically; and some storage device to pressure the numerical image data. It is further known for a digital imaging device, particularly a digital camera, to use a removable storage device, such as an integrated circuit memory card, to store images. For instance, U.S. Pat. No. 5,016,107 describes an electronic still camera utilizing image compression and providing digital storage in a removable memory card having a static random access memory. In this camera, the integrated circuits in the removable memory card store image data and a directory locating the data. The image data provided by the digital imaging device and stored in a memory card is ordinary used to produce some type of display or print, for example, a CRT display or a digital print made from images scanned from film or taken by an electronic camera.

Figure 8:
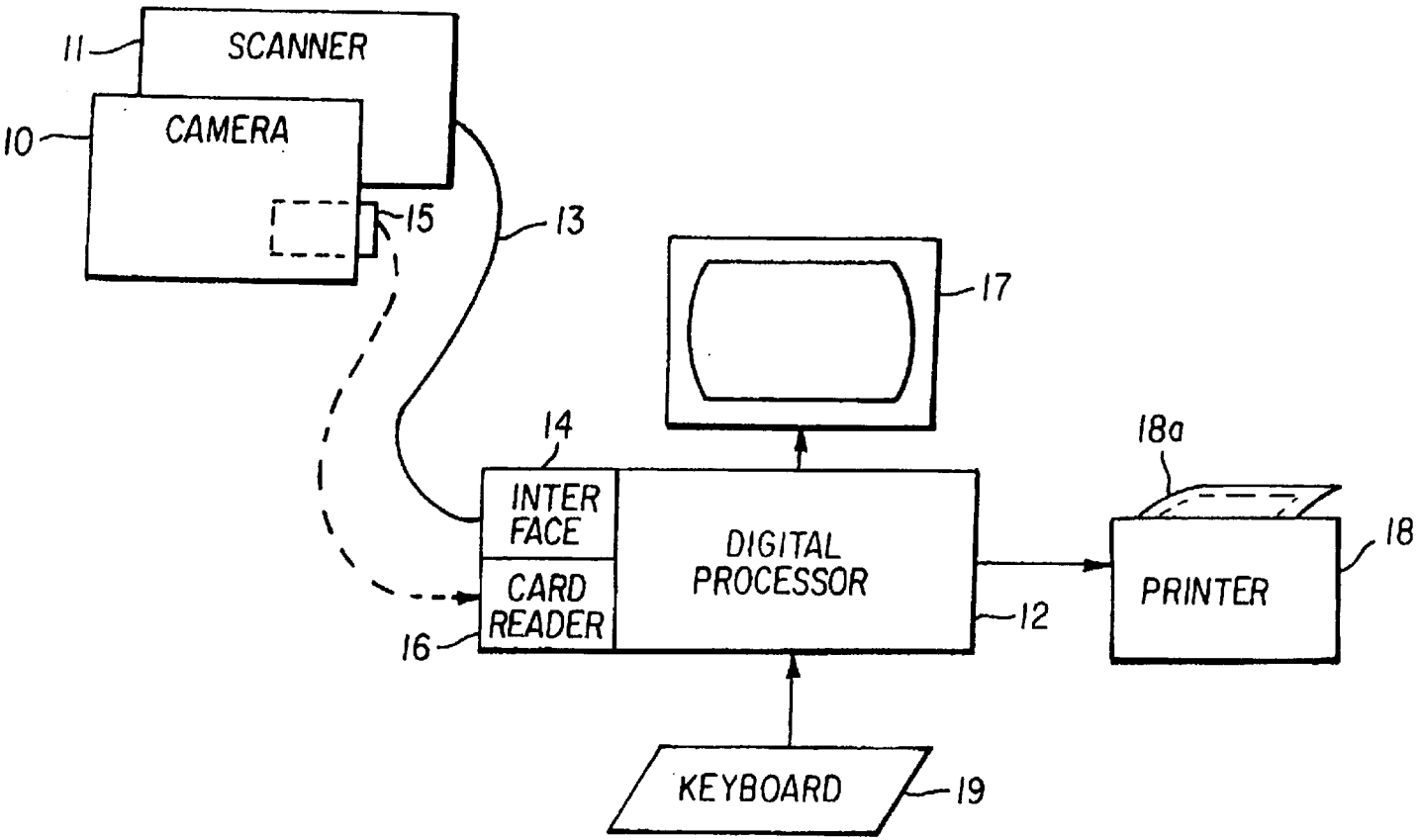
FIG. 8 is a block diagram of an electronic imaging system incorporating an imaging device in accordance with the invention.

As shown in FIG. 8, the digital imaging device, which may be an electronic camera 10 or a scanner 11, is utilized in a system including a digital processor 12. The digital image information produced by the digital imaging device is downloaded to the peripheral digital processor 12, as shown in FIG. 8, for further processing into a digital image. The downloading can be accomplished for either device in a number of ways, for instance by a cable connection 13 through an interface 14, or by removable media, such as a memory card 15, through a card reader 16. A suitable color CRT display 17 is connected to the digital processor 12 for displaying the images, and a printer 18 is connected to print out copies 18a of the images. A keyboard 19 is also connected for use in the processing of the images. The digital processor 12, which can be part of a conventional programmed computer, utilizes conventional processing techniques to process the digital image information according to algorithms stored in the computer or provided by application software used with the computer. For example, the digital processor 12 may include a conventional color management system, which links the input device (camera 10 or scanner 11) and the output device (CRT 17 or printer 18) by utilizing device profiles appropriate for the type of input and output devices used (e.g., one input profile for the camera 10 and another input profile for the scanner 11).

Figure 1:
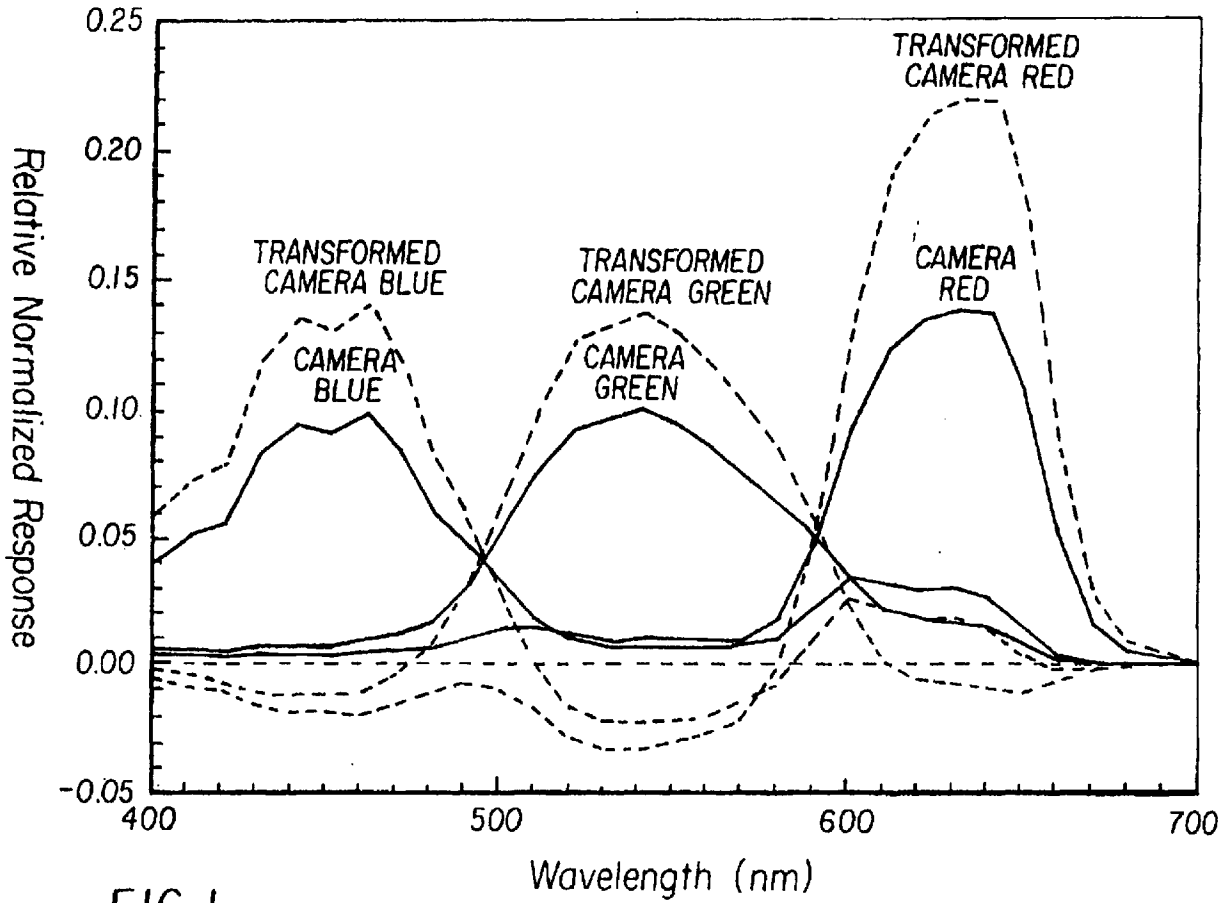
FIG. 1 is a comparison of the normalized original camera spectral characteristics and the transformed spectral characteristics following application of a color-correction matrix.
Figure 2:
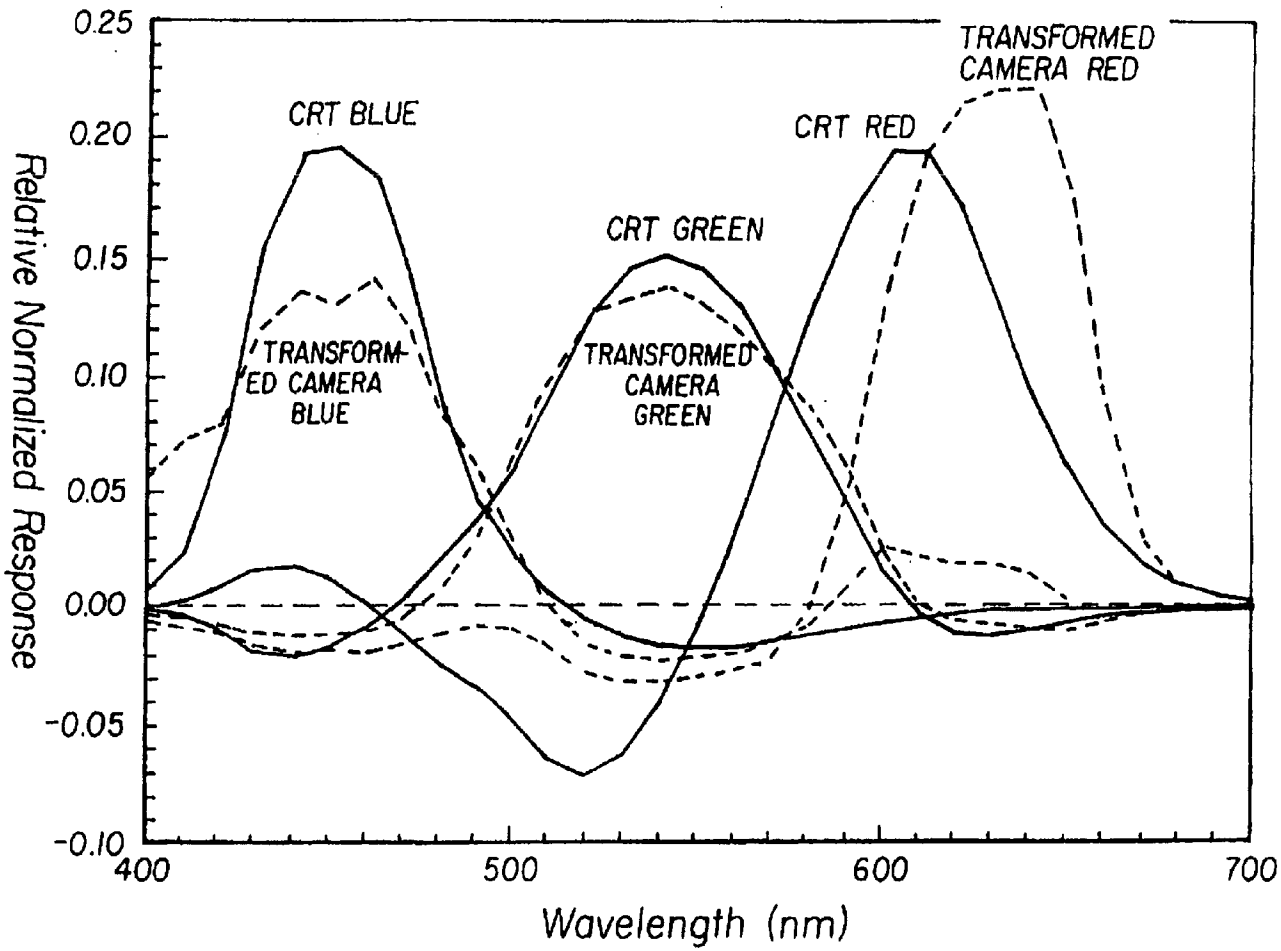
FIG. 2 is a comparison of the transformed camera spectral characteristics from FIG. 1 and the actual CMFs for a particular CRT.
Figure 3:
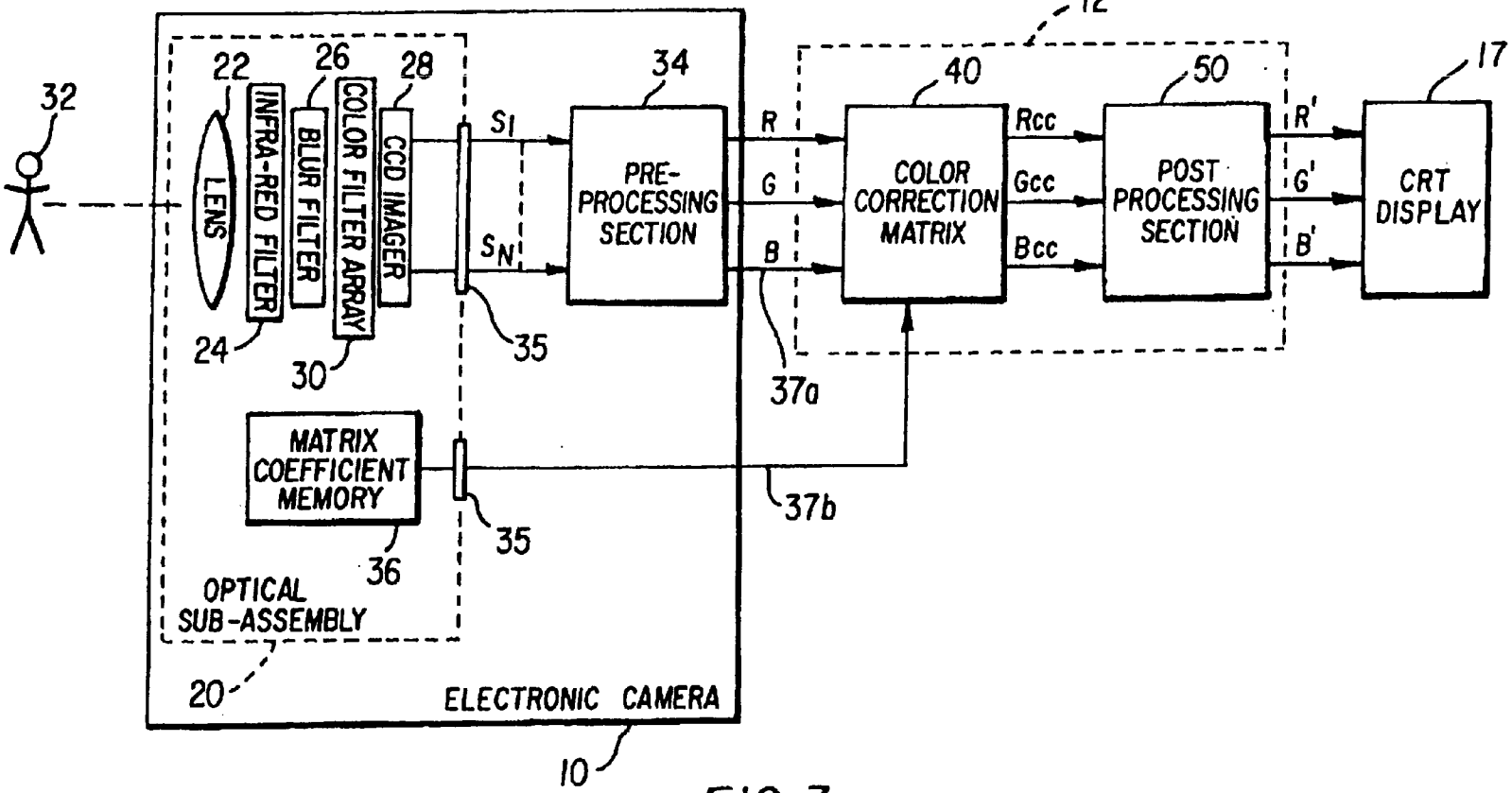
FIG. 3 is a block diagram showing the preferred embodiment of the invention where the color matrix is located on the optical assembly of the camera, but he actual color-correction operation utilizing the matrix is performed external to the camera.

The ultimate color performance of an electronic camera is directly influenced by the various optical components which comprise the image capture path. It is possible to maximize the color reproduction accuracy of a particular camera by computing a unique color correction matrix for hat camera which compensates for the unique optical characteristic of that camera. This approach also minimizes the variation in color reproduction from one camera to the next. With reference to FIG. 3, a simplified block diagram illustrating the preferred embodiment of the invention is shown. The electronic camera 10 has an optical sub-assembly 20 containing a lens 22, an infrared cutoff filter 24, a blur filter 26 and a CCD imager 28 with an integral color filter array (CFA) 30. The optical subassembly 20 has predetermined spectral sensitivities of the CCD imager 28 and the spectral characteristics of the lens 22, the infrared cutoff filter 24, and the blur filter 26. Due to these spectral sensitivities and spectral characteristics, the combination thereof uniquely distinguish this imaging device from other imaging devices of the same type. In other words, although different cameras 10 contain nominally identical optical elements, including sensors, this overall spectral responses will differ from camera to camera.

The optical subassembly 20, which is used to capture an image of the scene 32, is designated to be removable from the camera 10 for purposes of servicing and calibration. When installed in the camera, the optical subassembly electrically connects to a preprocessing section 34 through an electrical connecting means 35. Image-wise signals $S_1$–$S_N$ from the CCD imager 28 are converted to digital, linear RGB format within the camera by the pre-processing section 34 using techniques and components familiar to those skilled in the art. These digital RGB signals represent the red, green and blue primary components of the image, respectively. Pre-processing section 34 may perform such well-known tasks as double-correlated sampling of the CCD signals, black-level control, white-balance, analog-to-digital conversion, conversion of the CCD signals to RGB and interpolation of the CFA data to produce RGB values at each pixel location.

Figure 4:
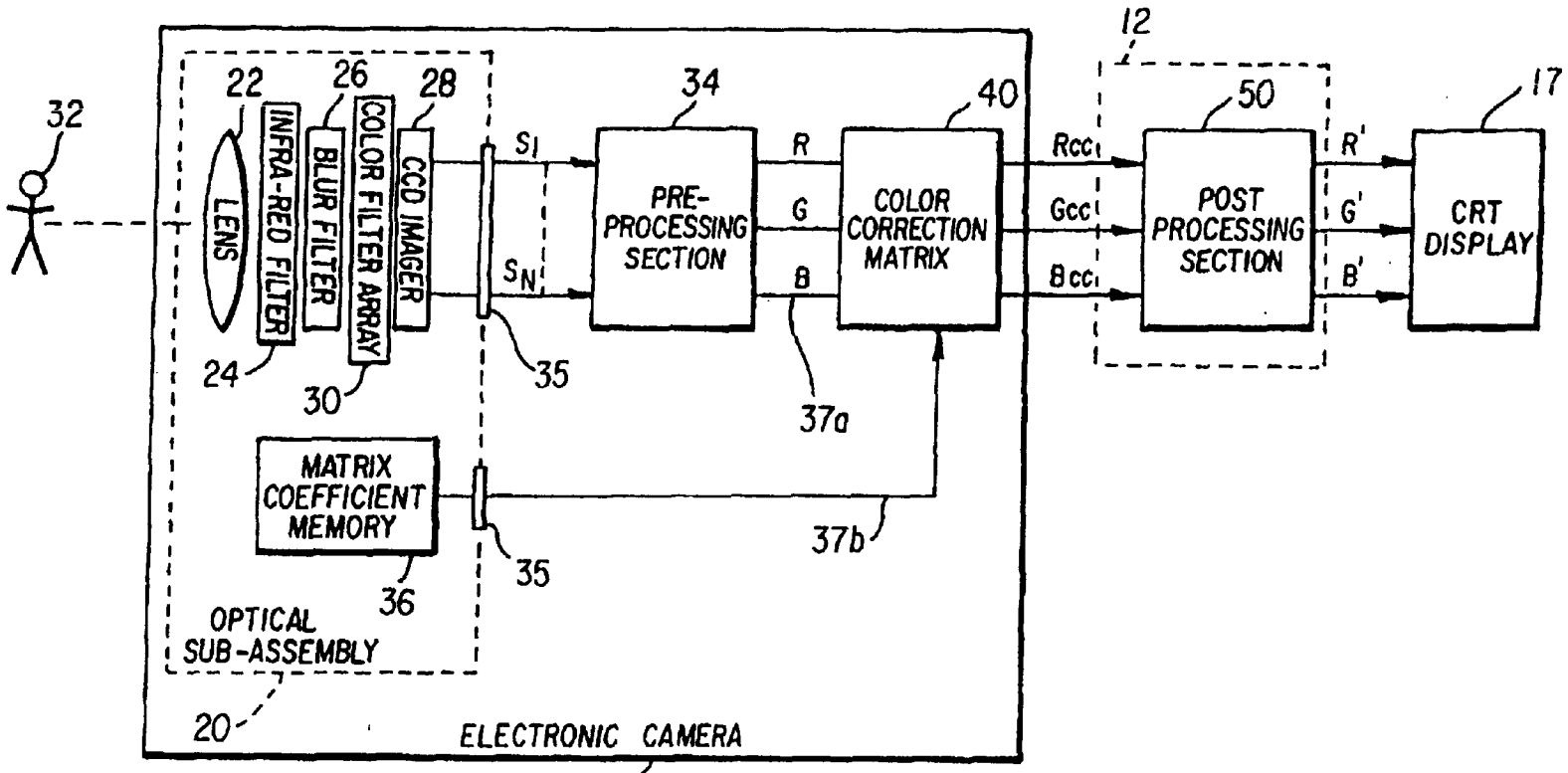
FIG. 4 is a block diagram showing a second version of the preferred embodiment of the invention wherein the color matrix is located on the optical assembly of the camera and the color-correction operation is performed internal to the camera.

Digital RGB values from the pre-processing section 34 are transformed to a set of color-corrected RGB values ($R_{CC}$, $G_{CC}$, $B_{CC}$) suitable for display on the color CRT display 17 by processing in a color matrix operation 40. In this embodiment of the invention, the color-correction matrix 40 operation is performed external to the camera as is shown in FIG. 3 in, for example, the digital processor 12 shown in FIG. 8. Therefore, the RGB signals and the matrix coefficients are provided to the external digital processor 12 via interface liens 37a and b. In a second version of the preferred embodiment of this invention, the color-correction matrix 40 operation is performed internal to the camera as illustrated in FIG. 4. Where this step is performed is not important to the teaching of this invention. In either case the color-correction matrix 40 operation is performed on RGB signals which vary linearly with exposure.

Color-corrected RGB signals ($R_{CC}$, $G_{CC}$, $B_{CC}$) following the color-correction matrix 40 operation are converted to a format suitable for CRT display by a post-processing section 50 using techniques and components familiar to those skilled in the art. Such post processing operations may include such tasks as interpolation, edge-enhancement and tone-scale remapping, for example.

In the preferred embodiment of this invention as shown in FIGS. 3 and 4, the color-correction matrix coefficients for the color matrix operation 40 are stored in a digital memory 36 co-located on the optical sub-assembly 20 with all of the other optical components. These coefficients are uniquely determined for each camera in order to correct the spectral sensitivities of the particular CCD imager 28 in the camera 10, and the spectral characteristics of the particular other elements in the optical subassembly 20, for the color sensitivities of the type of output device being used. (For this reason, while representing a specific imaging device, the coefficients are ordinarily calculated in relation to a reference output device, rather than a specific individual output device.) These coefficients are then applied to the color matrix operation 40 for color correction of the capture image. This approach has advantages in the production and service environments. In the production environment, optical sub-assemblies 20 can be fabricated, calibrated and stocked for later integration into the final product 10 without the need for calibrating the final product. In the service environment, since the optical subassembly is replaceably interconnected to the preprocessing section 34 through the electrical connecting means 35, optical sub-assemblies 20 can be simply replaced without the need for calibrating the repaired product. Since each optical subassembly 20 is calibrated for the particular optical components on the subassembly, it may be appreciated that the matrix coefficients stored in the memory 36 are unique for each subassembly 20, and therefore for each camera 10.

Note that, although RGB signals have been discussed by way of example as the tristimulus format of choice for representing the scene color information, this invention is not restricted to use with this format alone. Other tristimulus formats such as the CIE XYZ format are equally applicable and may, in fact, present advantages in a particular implementation. Sin the CIE XYZ format is a device independent space based on a set of CMFs defined by the CIE 1931 Standard Colorimetric Observer (2°), the matrix coefficients cold be used to generate an input profile unique to each camera which will correct the spectral sensitivities of the camera for the standardized CMFs of this device independent space. For example, in one application following the ICC Profile Format Specification (Version 3.2, Nov. 20, 1995, published by the International Color Consortium), RGB input profiles are established which will correct the spectral sensitivities of an input device for a connection space. Thereupon, output profiles are used to convert the signals from the connection space to a format that is expected by an output device. It should therefore be understood that this invention encompasses linear tristimulus formats in general while the discussion is limited to the familiar RG format for ease of understanding.

Figure 5:
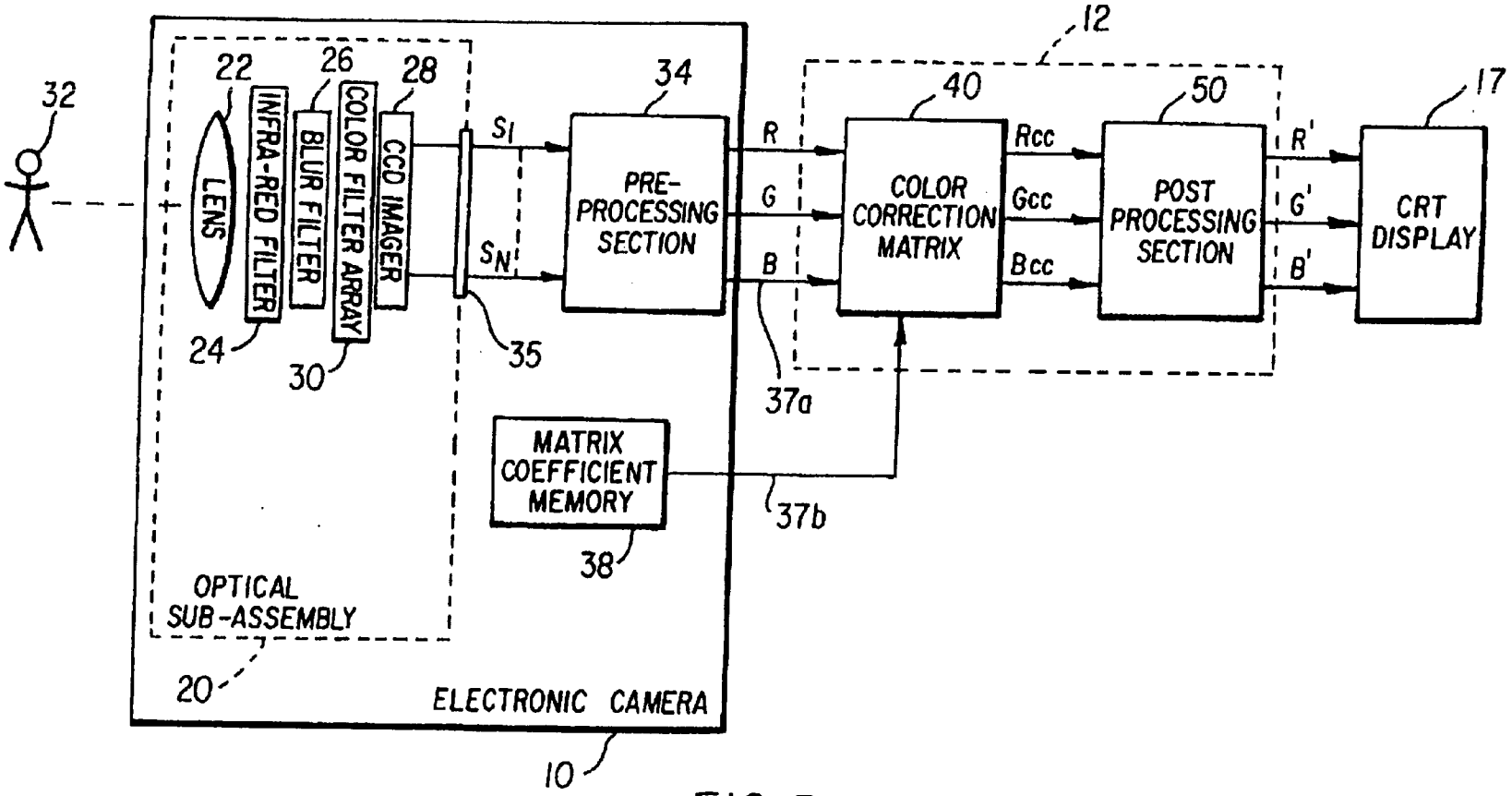
FIG. 5 is a block diagram showing a third embodiment of the ivneiton wherein the color matrix is located within the camera but external to the optical assembly of the camera.

FIG. 5 illustrates a third embodiment of the invention wherein the color-correction matrix coefficients for the matrix operation 40 are stored in a digital memory 38 located somewhere within the camera 10 but not necessarily on the optical sub-assembly 20. In this embodiment, the aforementioned advantages in the production and service environment are not realizable for the color reproduction accuracy and consistency goals of the invention are not compromised.

Figure 6:
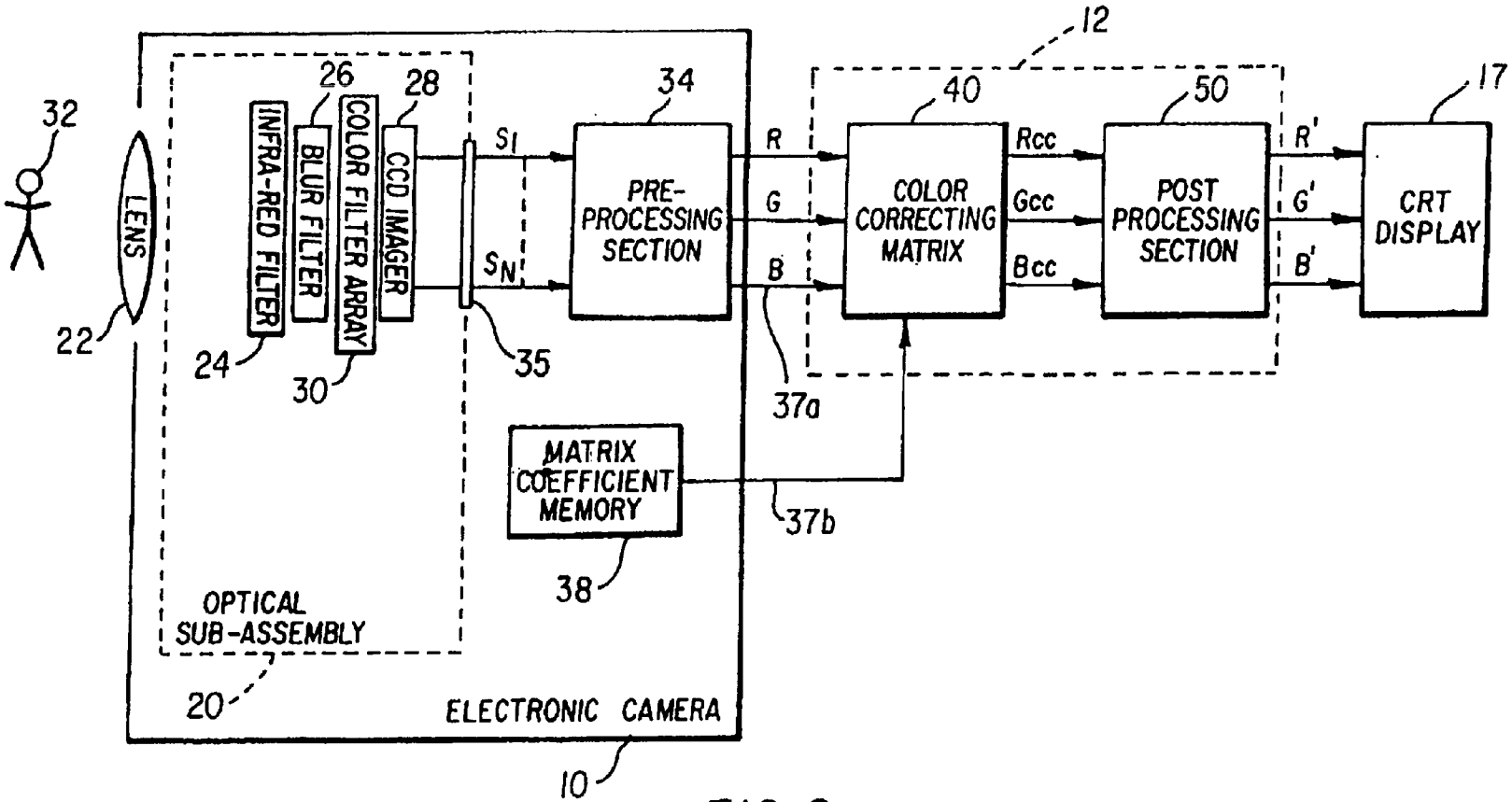
FIG. 6 is a block diagram showing a fourth embodiment of the invention wherein the lens is removable form the camera.

FIG. 6 illustrates a fourth embodiment of the invention wherein the lens 22 is not physically part of the optical sub-assembly and many, in fact, be removable as is the case of a camera with interchangeable lenses. In this situation the camera of optical sub-assembly, depending on where the color-coefficient matrix digital memory 38 is located, is calibrated using a lens with a spectral response representing the average of the spectral responses of all lenses that are anticipated to be used with the camera. This represents only a slight compromise since the lens does not contribute significantly to variations in color reproduction performance.

Figure 7:
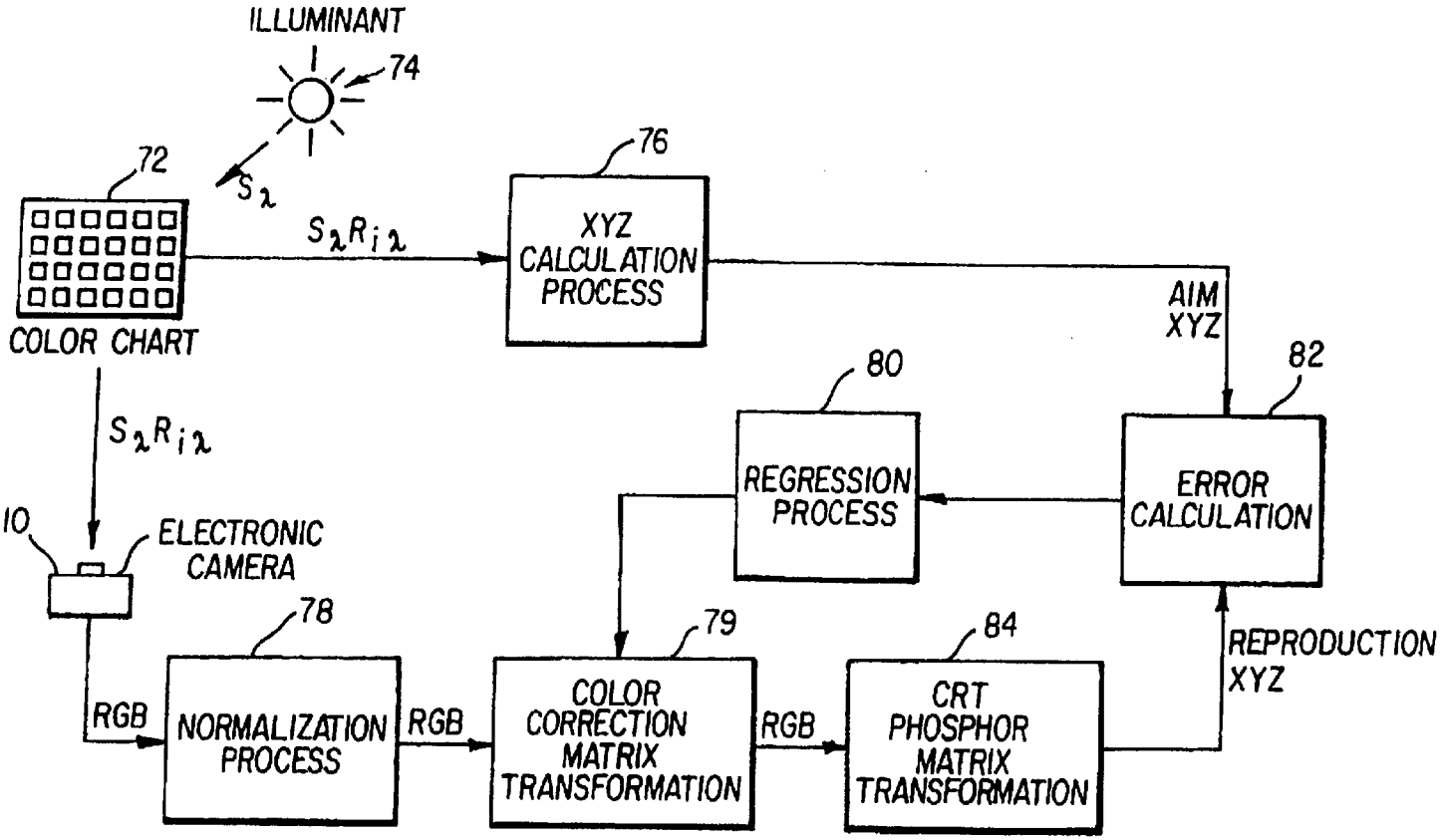
FIG. 7 is a block diagram outlining a general method for obtaining the color-correction matrix coefficients.

The present invention has been described thus far with regard to a series of preferred embodiments outlining the location of the color-correction matrix coefficients within the camera as well as their application in the image processing path. FIG. 7 illustrates a general method for obtaining these coefficients. A color chart 72 containing colors representative of the expected range of real wold colors provides the basis for the coefficients calculation process. An example of such a chart is the well known Macbeth Color Checker.

A necessary first step involves measurement of the spectral characteristics ($S_\lambda$) of the illuminant 74 as well as measurements of the spectral characteristics ($Ri_\lambda$) of each color patch of the color chart 72. CIE tristimulus values (XYZ), describing the location of a particular color patch in the 3-dimensional XYZ color pace, may then be computed form the measured optical spectral data as described in the aforementioned CIE publication 15.2 (1986) Colorimetry—Second Edition on pages 22–23. This set of XYZ values becomes the colorimetric aims for the camera.

The electronic camera 10 is used to capture an image of the color chart 72 under the specified illuminant 74. RGB camera signals representative of the captured color chart images are next subjected to a normalization process 78 to provide RGB signal switch vary linearly with scene luminance. The normalization process 78 may include removal of the camera gamma/knee characteristics as well as black-level, white-balance and exposure errors.

Linear RGB signals are transformed to a set of color-corrected TGB signals by color-correction matrix transformation 79. Initially this matrix is set equal to the identity matrix. The coefficients are subsequently adjusted in an iterative fashion by a regression process 80 until the average color error for all color patches of the color chart 72 is reduced to a predetermined level.

Color-corrected RGB signals from color-correction matrix transmission 79 are retransformed to a set of CIE XYZ signals by CRT phosphor matrix transformation 84. These signals represent the colors which would appear on the face of a reference CRT when presented with the color-corrected RGB signals from color-correction matrix transformation 79. It would be understood by someone skilled in the art that these color-corrected signals would first need to be modified to account for the nonlinear characteristics of the CRT phosphors. The resulting XYZ signals from CRT phosphor transformation matrix 84 representing the reproduced colors for each color patch of the color chart 72 for a reference output device, in this case the reference CRT.

An error calculation process 82 determines the average error between the aim and reproduction signals for all of the color patches on the color chart 72. An individual color error is first computed for each color patch using the square-root of the sum of the squares of the differences of the aim and reproduction X, Y and Z signals. This represents the vector length between the location of the aim and reproduction colors in the 3-dimensional XYZ color space. The last part of the error calculation is to average the individual color errors. This average color error is used in the regression process 80.

The foregoing matrix coefficient coloration process has been described from the standpoint of obtaining a good colorimetric match between the original scene and its reproduction on a CRT. For some application this may not be the desired color reproduction goal. Modification to the method shown in FIG. 7 may be made to achieve a preferred color reproduction goal by taking into account such factors as chromatic adaptation and more perceptually uniform color spaces.

The invention has been described with reference to a preferred embodiment. However, it will be appreciated that variations and modifications can be effected by a person of ordinary skill in the art without departing from the scope of the invention.

PARTS LIST

10 Electronic camera
11 Electronic scanner
12 Image processing external to camera (peripheral digital processor)
13 Interface cable
14 Digital interface
15 Memory card, removable
16 Card reader
17 Color CRT display
18 Printer, color
18a Color print
19 Keyboard
20 Optical sub-assembly
22 Lens
24 Infra-red cutoff filter
26 Blur filter
28 CCD Imager
30 Color filter array (CFA)
32 Scene
34 Camera video pre-processing section
36 Color-correction matrix coefficient memory on optical subassembly
38 Color-correction matrix coefficient memory in camera
40 Color-correction matrix transformation
50 Post-processing section
72 Color chart
74 Illuminant
76 XYZ calculation process

78 Normalization process
79 Color-correction matrix transformation
80 Regression process
82 Color error calculation process

I claim:

1. A digital imaging device for capturing an image and generating a color signal from the image for application to an output device having specific color sensitivities, said imaging device further being one of many devices of the same type useful with the output device, said digital imaging device comprising:

a color sensor for capturing the image and generating the color signal from the captured image, said color sensor having predetermined spectral sensitivities;

an optical section having predetermined spectral characteristics, said optical section interposed in image light from the image directed to the color sensor thereby imparting the predetermined spectral characteristics to the image light, the combination of the spectral sensitivities of the color sensor and the spectral characteristics of the optical section uniquely distinguishing the imaging device from other imaging devices of the same type; and a set of matrix coefficients uniquely determined for the imaging device in order to generate an optimized color signal, *wherein* said matrix coefficients *are* (*a*) *automatically calculated by a matrix coefficient calculation from image data obtained by the color sensor from a color chart and* (*b*) *used for* correcting the spectral sensitivities of the color sensor and the spectral characteristics of the optical section for the color sensitivities of the output device.

2. An imaging device as claimed in claim 1 in which the optical section includes a lens for directing the image light from the image upon the color sensor, said lens having a predetermined lens spectral characteristic, and wherein the matrix coefficients correct the lens spectral characteristic for the color sensitivities of the output device.

3. An imaging device as claimed in claim 1 in which the optical section includes a blurry filter for spatially low pass filtering the image light directed upon the color sensor, said blur filter having a predetermined spectral characteristic, and wherein the matrix coefficients correct the spectral characteristic for the color sensitivities of the output device.

4. An imaging device as claimed in claim 1 in which the optical section includes an infrared cutoff filter for filtering the image light directed upon the color sensor, said infrared cutoff filter having a predetermined infrared spectral characteristic, and wherein the matrix coefficients correct the infrared spectral characteristic for the color sensitivities of the output device.

5. An imaging device as claimed in claim 1 wherein the color sensor includes a color filter array for color filtering the image light directed upon the color sensor, said color filter array having a predetermined color filter spectral characteristic, and wherein the matrix coefficients correct the color filter spectral characteristic for the color sensitivities of the display device.

6. An imaging device as claimed in claim 1 wherein the imaging device comprises a digital camera.

7. An imaging device as claimed in claim 1 wherein the imaging device comprises a digital scanner.

8. An imaging device as claimed in claim 1 wherein the output device comprises a display device.

9. An imaging device as claimed in claim 1 wherein the output device comprises a printing device.

10. An imaging device as claimed in claim 1 further comprising a color processing section for implementing a matrix coefficient on the color signal in order to generate the optimized color signal, said color processing section using the set of matrix coefficients that are uniquely determined for the imaging device in order to generate the optimized color signal.

11. An imaging device as claimed in claim 1 in which the optical section and the set of matrix, coefficients are included on a sub-assembly that is removable from the digital imaging device for purpose of servicing and repair of the imaging device.

12. An imaging device as claimed in claim 1 in which the output device is a reference device, and said matrix coefficients correct the spectral sensitivities of the color sensor and the spectral characteristics of the optical section for the reference color sensitivities of the output device.

13. An electronic imaging system including a component useful with an imaging device as claimed in claim 1, wherein the computer comprises a color processing section for implementing a matrix connection on thee color signal using the set of matrix coefficients in order to generate the optimized color signal, and the imaging device provides the color signal together with the matrix coefficients to the computer.

14. An imaging device as claimed in claim 1 in which the optical section includes a lens for directing the image light from the image upon the color sensor, said lens being removable from the imaging device and having a predetermined reference lens spectral characteristic, and wherein the matrix coefficients correct the reference lens spectral characteristic for the color sensitivities of the output device.

15. An imaging device as claimed in claim 1 in which the output device is represented by a connection space, and said matrix coefficients are part of a device profile for connecting the spectral sensitivities of the color sensor and the spectral characteristics of the optical section for the color sensitivities of the connection space.

16. A digital camera for capturing an image and generating a color signal from the image for input to an intended display device having specific color sensitivities, said camera further being one of many cameras of the same type useful with the display device, said camera comprising:

a color sensor for capturing the image and generating the color signal from the captured image, said color sensor having predetermined spectral sensitivities defining the color response of the color sensor;

a lens for directing image light from the image upon the color sensor, said lens having a predetermined lens spectral characteristic;

an infrared cutoff filter having a predetermined infrared spectral characteristic for filtering the image light directed upon the color sensor;

the combination of said spectral sensitivities of the color sensor and the spectral characteristics of the lens and the infrared cutoff filter uniquely distinguishing the digital camera from other digital cameras of the same type; and a matrix storage containing a set of matrix coefficients uniquely determined for the camera in order to generate an optimized color signal, *wherein* said matrix coefficients *are* (*a*) *automatically calculated by a matrix coefficient calculation from image data obtained by the color sensor from a color chart and* (*b*) *used for* correcting the spectral sensitivities of the color sensor and the spectral characteristics of the lens and the infrared cutoff filter for the color sensitivities of the intended display device.

17. A digital camera as claimed in claim 16 further comprising a blur filter having a predetermined low pass spatial characteristic for low pass filtering the image light directed upon the color sensor, and wherein the matrix coefficients further correct the spectral characteristic of the blur filter for the color sensitivities of the intended display device.

18. A digital camera as claimed in claim 16 wherein the color sensor includes a color filter array for color filtering the image light directed upon the color sensor, said color filter array having a predetermined color filter spectral characteristics, and wherein the matrix coefficients correct the spectral characteristic of the color filter array for the color sensitivities of the intended display device.

19. A digital camera as claimed in claim 16 further comprising a color processing section for implementing a matrix correction of the color signal in order to generate the optimized color signal, said color processing section using the set of matrix coefficients in the matrix storage that are uniquely determined for this digital camera in order to generate the optimized color signal.

20. An electronic imaging system including a computer useful with a digital camera as claimed in claim 16, wherein the computer comprises a color processing section for implementing a matrix correction on the color signal using the set of matrix coefficients in the matrix storage in order to generate the optimized color signal, and the digital camera provides the color signal together with the matrix coefficients to the computer.

21. A digital camera for capturing an image and generating an optimized color signal from the image for input to an intended display device having specific color sensitivities, said camera further being one of many cameras of the same type useful with the display device, said camera comprising:

a color sensor comprising a color filter array and a photosensor for capturing the image and generating a color signal from the captured image, said color sensor having predetermined spectral sensitivities defining the color response of a specific color sensor employed in the digital camera;

an optical section including at least a lens for directing image light from the image upon the color sensor and an infrared cutoff filter for filtering the image light directed upon the color sensor, said optical section having optical spectral characteristics comprised of a specific lens spectral characteristic which together define the optical response of a specific optical section employed in the digital camera;

the combination of said spectral sensitivities of the color sensor and the spectral characteristics of the optical section uniquely distinguishing the digital camera from other digital cameras of the same type;

a memory containing matrix coefficients uniquely determined *by a matrix coefficient calculation* for *use by* the camera in order to generate the optimized color signal, *wherein* said matrix coefficients *are* (*a*) *automatically computed from image data obtained by the color sensor from a color chart and* (*b*) *used for* correcting the spectral sensitivities of the color sensor and the spectral characteristics of the optical section for the color sensitivities of the intended display device; and a color processing section for implementing a matrix correction on the color signal using the matrix coefficients in the memory in order to generate the optimized color signal.

22. A digital camera as claimed in claim 21 wherein said optical section further includes a blur filter for spatially low pass filtering the image light directed upon the color sensor, said blur filter having a predetermined spectral characteristic, and wherein the matrix coefficients further correct the spectral characteristic of the blur filter for the color sensitivities of the intended display device.

23. A digital camera for capturing an image and generating a color signal from the image for input through an external processor to an intended display device having specific color sensitivities, said external processor including a color processing section for implementing a matrix correction on the color signal in order to generate an optimized color signal, said camera further being one of many cameras of the same type useful with the display device, said camera comprising:

a color sensor comprising a color filter array and a photosensor for capturing the image and generating the color signal from the captured image, said color sensor having predetermined spectral sensitivities defining the color response of the sensor;

an optical section including at least a lens for directing image light from the image upon the color sensor and an infrared cutoff filter for filtering the image light directed upon the color sensor, said optical section having optical spectral characteristics comprised of a specific lens spectral characteristic which together define the optical response of a specific optical section employed in the digital camera;

the combination of said spectral sensitivities of the color sensor and the spectral characteristics of the optical section uniquely distinguishing the digital camera from other digital cameras of the same type;

a memory containing matrix coefficients uniquely determined for the camera in order to generate the optimized color signal, *wherein* said matrix coefficients *are* (*a*) *automatically calculated by a matrix coefficient calculation from image data obtained by the color sensor from a color chart and* (*b*) *used for* correcting the spectral sensitivities of the color sensor and the spectral characteristics of the optical section for the color sensitivities of the intended display device; and means for providing the color signal and the matrix coefficients to the external processor.

24. A digital camera as claimed in claim 23 wherein said optical section further includes a blur filter for spatially low pass filtering the image light directed upon the color sensor, said blur filter having a predetermined spectral characteristic controlling the response of the optical section, and wherein the matrix coefficients further correct the spectral characteristics of the filter for the color sensitivities of the intended display device.

25. A digital camera for capturing an image and generating a color signal from the captured image, said camera comprising:

a main assembly for housing the camera; and a removable subassembly including a color sensor having specific color sensitivities for capturing the image and generating the color signal, an optical section including at least a lens and an infrared filter having respective lens and cutoff spectral characteristics, and a memory device containing matrix coefficients for color correcting the spectral sensitivities of the color sensor and the spectral characteristics of the optical section for the color sensitivities of the display device;

a signal processing section for processing the color signal generated by the color sensor;

electrical connecting means for replaceably interconnecting the signal processing section and the subassembly; and a color processing section for implementing a matrix correction on the color signal using the matrix coefficients in the memory device in order to generate an optimized color signal.

26. A digital camera for capturing an image and outputting a color image signal to an external processor, said external processor including a color processing section for implementing a matrix correction on the color image signal in order to generate an optimized color signal from the captured image, said camera comprising:

a main assembly for housing the camera;

a removable subassembly including a color sensor having specific color sensitivities for capturing the image and generating a color signal, an optical section including at least a lens and an infrared filter having respective lens and cutoff spectral characteristics, and a memory device containing matrix coefficients for color correcting the spectral sensitivities of the color sensor and the spectral characteristics of the optical section for the color sensitivities of the display device;

a signal processing section for processing the color signal generated by the color sensor;

electrical connecting means for replaceably interconnecting the signal processing section and the subassembly; and means for providing the color image signal and the matrix coefficients to the external processor.

27. A digital camera for capturing an image and generating a color signal from the image for input through an external processor operative in a connection space having specific color sensitivities defined by a set of color matching functions, said external processor including a color processing section for implementing a matrix correction on the color signal in order to generate an optimized color signal, said camera further being one of many cameras of the same type, said camera comprising:

a color sensor comprising a color filter array and a photosensor for capturing the image and generating the color signal from the captured image, said color sensor having predetermined spectral sensitivities defining the color response of the sensor;

an optical section including at least a lens for directing image light from the image upon the color sensor and an infrared cutoff filter for filtering the image light directed upon the color sensor, aid optical section having optical spectral characteristics comprised of a specific lens spectral characteristics which together define the optical response of a specific optical section employed in the digital camera;

the combination of said spectral sensitivities of the color sensor and the spectral characteristics of the optical section uniquely distinguishing the digital camera from other digital cameras of the same type;

a memory containing matrix coefficients uniquely determined for the camera in order to generate the optimized color signal, *wherein* said matrix coefficients [being] *are* (*a*) *automatically calculated by a matrix coefficient calculation from image data obtained by the color sensor from a color chart and* (*b*) *used as* part of a device profile for correcting the spectral sensitivities of the color sensor and the spectral characteristics of the optical section for the color sensitivities of the connection space; and means for providing the color signal and the matrix coefficients to the external processor.

28. A digital camera as claimed in claim 27 wherein said optical section further includes a blur filter for spatially low pass filtering the image light directed upon the color sensor, said blur filter having a predetermined spectral characteristic controlling the response of the optical section, and wherein the matrix coefficients further correct the spectral characteristic of the blur filter for the color sensitivities of the connection space.

*29. An imaging device as claimed in claim 1 wherein the matrix coefficient calculation comprises processing blocks for* (*a*) *measuring spectral characteristics of colors of the color chart as illuminated by an illuminant and computing colorimetric values for each color/illuminant combination from the measured spectral characteristics, thereby obtaining a set of colorimetric aims for the imaging device,* (*b*) *capturing an image of the color chart by using the color sensor, thereby obtaining color image data representative of the image of the color chart,* (*c*) *processing the color image data in a color-correction matrix comprising a set of adjustable, color-correction coefficients and generating reproduction signals for the colors of the color chart, and* (*d*) *iteratively adjusting the adjustable, color-correction coefficients until the error between the reproduction signals and the colorimetric aims is reduced to a predetermined level.*

*30. A digital camera as claimed in claim 16 wherein the matrix coefficient calculation comprises processing blocks for* (*a*) *measuring spectral characteristics of colors of the color chart as illuminated by an illuminant and computing colorimetric values for each color/illuminant combination from the measured spectral characteristics, thereby obtaining a set of colorimetric aims for the imaging device,* (*b*) *capturing an image of the color chart by using the color sensor, thereby obtaining color image data representative of the image of the color chart,* (*c*) *processing the color image data in a color-correction matrix comprising a set of adjustable, color-correction coefficients and generating reproduction signals for the colors of the color chart, and* (*d*) *iteratively adjusting the adjustable, color-correction coefficients until the error between the reproduction signals and the colorimetric aims is reduced to a predetermined level.*

*31. A digital camera as claimed in claim 21 wherein the matrix coefficient calculation comprises processing blocks for* (*a*) *measuring spectral characteristics of colors of the color chart as illuminated by an illuminant and computing colorimetric values for each color/illuminant combination from the measured spectral characteristics, thereby obtaining a set of colorimetric aims for the imaging device,* (*b*) *capturing an image of the color chart by using the color sensor, thereby obtaining color image data representative of the image of the color chart,* (*c*) *processing the color image data in a color-correction matrix comprising a set of adjustable, color-correction coefficients and generating reproduction signals for the colors of the color chart, and* (*d*) *iteratively adjusting the adjustable, color-correction coefficients until the error between the reproduction signals and the colorimetric aims is reduced to a predetermined level.*

*32. A digital camera as claimed in claim 23 wherein the matrix coefficient calculation comprises processing blocks for* (*a*) *measuring spectral characteristics of colors of the color chart as illuminated by an illuminant and computing colorimetric values for each color/illuminant combination from the measured spectral characteristics, thereby obtaining a set of colorimetric aims for the imaging device,* (*b*) *capturing an image of the color chart by using the color sensor, thereby obtaining color image data representative of the image of the color chart,* (*c*) *processing the color image data in a color-correction matrix comprising a set of adjustable, color-correction coefficients and generating*

*reproduction signals for the colors of the color chart, and (d) iteratively adjusting the adjustable, color-correction coefficients until the error between the reproduction signals and the colorimetric aims is reduced to a predetermined level.*

*33. A digital camera as claimed in claim 27 wherein the matrix coefficient calculation comprises processing blocks for (a) measuring spectral characteristics of colors of the color chart as illuminated by an illuminant and computing colorimetric values for each color-illuminant combination from the measured spectral characteristics, thereby obtaining a set of colorimetric aims for the imaging device, (b) capturing an image of the color chart by using the color sensor, thereby obtaining color image data representative of the image of the color chart, (c) processing the color image data in a color-correction matrix comprising a set of adjustable, color-correction coefficients and generating reproduction signals for the colors of the color chart, and (d) iteratively adjusting the adjustable, color-correction coefficients until the error between the reproduction signals and the colorimetric aims is reduced to a predetermined level.*

* * * * *

UNITED STATES PATENT AND TRADEMARK OFFICE

CERTIFICATE OF CORRECTION

PATENT NO. : RE 39,712 E
APPLICATION NO. : 11/405920
DATED : July 3, 2007
INVENTOR(S) : Richard M. Vogel It is certified that error appears in the above-identified patent and that said Letters Patent is hereby corrected as shown below:

| | |
|---|---|
| Column 9, line 2 of claim 3 | delete “blurry” and insert --blur--. |
| Column 10, line 3 of claim 10. | delete “coefficient” and insert --correction--. |
| Column 10, line 2 of claim 11. | delete “matrix,” and insert --matrix--. |
| Column 10, line 1 of claim 13. | delete “component” and insert --computer--. |
| Column 10, line 4 of claim 13. | delete “connection on thee” and insert --correction on the--. |
| Column 10, line 3 of claim 15. | delete “connecting” and insert --correcting--. |
| Column 11, line 5 of claim 18. | delete “characteristics,” and insert --characteristic,--. |
| Column 11, line 3 of claim 19. | delete “of” and insert --on--. |
| Column 12, lines 6 and 7 of claim 24. | delete “characteristics” and insert --characteristic--. |
| Column 12, line 7 of claim 24. | before “filter” insert --blur--. |
| Column 13, line 2 of claim 27. | delete “through” and insert --to--. |
| Column 13, line 20 of claim 27. | delete “characteristics” and insert --characteristic--. |
| Column 13, line 29 of claim 27. | after “coefficients” delete “being”. |

UNITED STATES PATENT AND TRADEMARK OFFICE

CERTIFICATE OF CORRECTION

PATENT NO. : RE 39,712 E
APPLICATION NO. : 11/405920
DATED : July 3, 2007
INVENTOR(S) : Richard M. Vogel It is certified that error appears in the above-identified patent and that said Letters Patent is hereby corrected as shown below:

Column 16, line 14 of claim 33. delete “color-correction” and insert --color correction--.

Signed and Sealed this

Twenty-third Day of October, 2007

JON W. DUDAS
*Director of the United States Patent and Trademark Office*